United States Patent
Mallary

(10) Patent No.: US 6,307,719 B1
(45) Date of Patent: Oct. 23, 2001

(54) SUSPENSION ASSEMBLY WITH ADJUSTABLE GRAMLOAD

(75) Inventor: Michael Mallary, Berlin, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/442,112

(22) Filed: Nov. 17, 1999

(51) Int. Cl.$^7$ .................................................. G11B 21/02
(52) U.S. Cl. ........................... 360/294.7; 360/244.8; 360/254.6
(58) Field of Search ................................ 360/254, 254.1, 360/254.2, 254.3, 254.4, 254.5, 254.6, 254.7, 254.8, 254.9, 52, 46, 50, 53, 25, 66, 75, 76, 244.6, 266.1, 244.8, 294.7

(56) References Cited

U.S. PATENT DOCUMENTS

| | | | |
|---|---|---|---|
| 4,605,979 | | 8/1986 | Inoue et al. ........................ 360/254.3 |
| 4,635,139 | * | 1/1987 | Nguyen et al. ........................ 360/25 |
| 4,661,873 | | 4/1987 | Schulze ............................. 360/254.3 |
| 4,670,804 | | 6/1987 | Kant et al. ........................ 360/254.2 |
| 5,111,348 | * | 5/1992 | Baba ................................ 360/77.06 |
| 5,537,034 | | 7/1996 | Lewis ................................. 324/212 |
| 5,715,110 | * | 2/1998 | Nishiyama et al. .................... 360/67 |
| 5,812,343 | * | 9/1998 | Budde et al. ....................... 360/244.6 |
| 5,863,237 | * | 1/1999 | Felts et al. ............................. 451/41 |
| 5,917,670 | | 6/1999 | Scaramuzzo et al. .................. 360/53 |
| 5,991,114 | * | 11/1999 | Huang et al. ........................... 360/75 |
| 6,005,726 | * | 12/1999 | Tsunoda .................................. 360/46 |
| 6,018,428 | * | 1/2000 | Okamura ............................... 360/25 |
| 6,038,090 | * | 3/2000 | Freitas .................................. 360/46 |
| 6,040,953 | * | 3/2000 | Malone et al. ........................ 360/53 |
| 6,069,761 | * | 5/2000 | Stupp ................................... 360/66 |
| 6,088,176 | * | 7/2000 | Smith et al. ........................... 360/46 |
| 6,091,557 | * | 7/2000 | Hahizume ............................. 360/46 |
| 6,094,316 | * | 7/2000 | Pham et al. ........................... 360/46 |
| 6,101,054 | * | 8/2000 | Tsunoda ............................... 360/46 |
| 6,104,557 | * | 8/2000 | Kasai et al. ........................... 360/46 |
| 6,104,563 | * | 8/2000 | Dovek .................................. 360/66 |
| 6,111,711 | * | 8/2000 | Barber et al. ......................... 360/46 |
| 6,130,791 | * | 10/2000 | Muto .................................... 360/46 |
| 6,130,793 | * | 10/2000 | Ohmori et al. ........................ 360/53 |
| 6,137,643 | * | 10/2000 | Flynn ................................... 360/25 |
| 6,172,832 | * | 1/2001 | Dovek et al. ......................... 360/66 |
| 6,178,053 | * | 1/2001 | Narita .................................. 360/25 |
| 6,195,219 | * | 2/2001 | Smith ................................... 360/66 |
| 6,226,136 | * | 5/2001 | Chem ................................... 360/25 |
| 6,239,936 | * | 5/2001 | Abraham et al. ..................... 360/75 |
| 6,265,689 | * | 7/2001 | Takahashi ........................... 324/212 |
| 6,266,203 | * | 7/2001 | Street et al. ........................... 369/69 |

* cited by examiner

*Primary Examiner*—David L. Ometz
*Assistant Examiner*—Franklin D. Altman, III
(74) *Attorney, Agent, or Firm*—David M. Sigmond

(57) ABSTRACT

A suspension assembly that supports a head adjacent to a rotating storage disk is provided for use within a single or multi-platter disk drive. The suspension assembly includes a generally elongated loadbeam that has an electrically grounded baseplate at a first end thereof and a gimbaled flexure portion for supporting the head over the rotating storage disk at a second end thereof. A power conductor electrically interconnected between a power source and the loadbeam enables the power source to heat a predetermined portion of the loadbeam to adjust the gramload of the suspension assembly for controlling the fly height of the head.

72 Claims, 5 Drawing Sheets

SUSPENSION ASSEMBLY WITH ADJUSTABLE GRAMLOAD

FIELD OF THE INVENTION

The invention relates generally to hard disk drives and more precisely to a hard disk drive having a head suspension assembly with adjustable gramload for providing head flying height control.

BACKGROUND OF THE INVENTION

Magnetic hard disk drives include a rotating rigid storage disk and a transducer positioner for positioning a read/write transducer at different radial locations relative to the axis of disk rotation, thereby defining numerous concentric data storage tracks on each recording surface of the disk. The transducer positioner is typically referred to as an actuator. Although numerous actuator structures are known in the art, in-line rotary voice coil actuators are now most frequently employed due to their simplicity, high performance, and mass balance about their axes of rotation, the latter being important for making the actuator less sensitive to perturbations. The in-line rotary voice coil actuator is less susceptible to disturbances external to the disk drive, which can otherwise move the read/write transducer to an unexpected position over the storage disk. A closed-loop servo system within the disk drive is conventionally employed to operate the voice coil actuator and position the read/write transducer with respect to the disk storage surface.

The read/write transducer, which may be of a single or dual element design, is typically mounted on a ceramic slider structure, the slider structure having an air bearing surface for supporting the read/write transducer at a small distance away from the rotating storage disk. Single read/write transducer designs typically require two-wire connections while dual designs having separate reader and writer elements require a pair of two-wire connections.

Sliders are generally mounted on a gimbaled flexure portion. The gimbaled flexure portion is attached to one end of a load beam assembly. An opposite end of the loadbeam assembly is attached to the in-line rotary voice coil actuator, which provides pivotal motion to the suspension assembly. A spring biases the load beam and the slider with the read/write transducer towards the disk, while the air pressure beneath the slider developed by disk rotation relative to the slider pushes the slider away from the disk. The gimbaled flexure enables the slider to present a "flying" altitude toward the disk surface and to follow its topology. An equilibrium distance defines an "air bearing" and determines the "flying height" of the read/write transducer. Although the separation between the read/write transducer and disk created by the air bearing reduces read/write transducer efficiency, the avoidance of direct contact of the transducer with the disk vastly improves reliability and extends the useful life of the read/write transducer and disk. The air bearing slider and read/write transducer combination is also known as a read/write head/slider assembly (herein "head").

Currently, nominal flying heights are on the order of 0.5 to 2 microinches. For a given read/write transducer, the magnetic storage density increases as the read/write transducer approaches the storage surface of the disk. Thus, a very low flying height is traded against transducer reliability over a reasonable service life of the disk drive. As a corollary, maintaining the same predetermined flying height over each disk incorporated into a disk drive and between different disk drives of the same type is critical.

One problem arises as a result of suspension assemblies that have variations in intrinsic stiffness. Variations in the intrinsic stiffness of each of the suspension assemblies incorporated into a multi-platter disk drive result in heads that fly at different heights. Because the efficiency of the magnetic recording process changes significantly with the flying height, variations in flying height result in corresponding variations in recording storage densities. Because it is practically impossible to know the variations in flying height of any given head/suspension combination, multi-platter disk drives typically record data at less than optimal storage densities to allow for the variations in flying heights of the heads incorporated therein. This lowers the overall storage capacity of the multi-platter disk drive.

An additional problem in multi-platter disk drives results from variations in Z-heights between each suspension assembly and its respective storage surface. The Z-height of a suspension assembly is defined as the vertical distance between the baseplate of the suspension assembly and the storage surface of its associated storage disk. Variations in Z-heights result from the numerous deviations from predetermined dimensions that occur during the manufacturing and assembly process of the disk drive. In particular, the staking process used to attach the baseplate of the suspension assembly to the head arm of the rotary actuator minutely deforms a portion of the suspension assembly. These minute deformations of each suspension assembly affect the Z-height of each suspension assembly within the drive. The variations in Z-heights of the suspension assemblies are further translated to each head attached thereto. Other areas where manufacturing variances can result in deviations from predetermined dimensions include the spacing between the actuator arms, spacings between the storage disks formed by storage disk rings or disk spacers, and general positioning of components and torque settings of fasteners within the disk drive.

A conventional method of compensating for variations in both suspension assembly intrinsic stiffness and suspension assembly Z-height is to adjust the stiffness and Z-height of the suspension assembly during the manufacturing and assembly process of the disk drive. Typically these variations are adjusted by locally heating a portion of each suspension assembly with a laser. This localized heating changes the spring constant thereof. As a result, the spring constant of each suspension assembly is adjusted to have a predetermined gramload force so that all the heads employed within a single or multi-platter disk drive will fly at a substantially uniform flying height.

One drawback to using a laser beam to provide localized heating of the suspension assembly is that heating must be completed prior to final assembly and operation of the disk drive. The gramload of a suspension assembly and the resultant flying height of the head attached thereto are typically dictated by estimated defects in the flatness of the rotating storage disk employed within the disk drive. Typical defects in the flatness of storage disks are known as asperities. An asperity is generally a small bump on the storage surface of the storage disk that is formed during the manufacturing process of the disk. Because asperities have varying heights, those having a height greater than the fly height may be contacted by the head, causing the temperature of the head to rise abruptly. Such asperities are known as thermal asperities. If a head repeatedly hits thermal asperities, the head can be damaged or its life expectancy may be reduced. Therefore, a disk drive designer must estimate the approximate height of all potential asperities and adjust the gramload of each suspension in the disk drive so that the attached heads will fly over the highest predicted asperity.

Because the dimensions and positions of asperities are fundamentally unpredictable, disk drive designers have had to adjust suspension assembly gramloads to fly heads at conservative minimum flying heights to insure adequate clearance between the heads and the asperities. However, heads that fly at these predetermined conservative heights over disks that don't have asperities unnecessarily and severely reduce the storage capacity of the disk drive that they are incorporated into.

Thus, a hitherto unsolved need remains for a method of and apparatus for adjusting the gramload of a suspension assembly so that the head will fly at the minimum height possible without subjecting the head to thermal asperities, thus optimizing the life expectancy of the head and the storage capacity of a disk drive simultaneously.

SUMMARY OF THE INVENTION

The present invention satisfies this need.

One objective of the present invention is to provide a suspension assembly with an adjustable gramload for adjusting the flying height, after the disk drive has been assembled. The suspension assembly of the present invention comprises a generally elongated loadbeam that has an electrically grounded baseplate defined at a first end thereof and a gimbaled flexure portion defined at a second end thereof. The baseplate includes a central bore for enabling the first end of the loadbeam to be attached to a head arm of an electrically grounded rotary actuator assembly. The loadbeam further includes a windowed portion that is formed adjacent to the baseplate. A pair of ramped planar legs is formed adjacent to the windowed portion. The ramped planar legs provide a substantial portion of the downwardly directed gramload force that is transposed to the head, which is supported by the gimbaled flexure portion defined at the second end of the loadbeam. The suspension assembly according to the present invention further includes at least one power conductor, or power trace having one end electrically attached to the loadbeam of the suspension assembly and another end electrically attached to a power source. A microprocessor is coupled to the power source for controlling the power source to incrementally increase the magnitude and duration of electric current pulses provided by the power source to the loadbeam. The electric current pulses follow a path from the loadbeam to ground via the ramped planar legs. When the electric current pulses traverse the legs, the legs become heated due to their relatively high electrical resistance. Heating the planar legs with electrical current pulses, under the control of the microprocessor, alters the gramload of the suspension assembly and adjusts the flying height of the head attached to the flexure portion of the suspension assembly.

A second objective of the present invention is to provide a method for dynamically adjusting the gramload, during operation, in response to the detection of thermal asperities. Accordingly, a disk drive incorporating the suspension assembly with adjustable gramload is spun up and the suspension assembly is controlled to move its attached head to a position adjacent to the storage surface of the rotating storage disk. If the head senses defects on the storage surface of the storage disk, such as thermal asperities, the power source under microprocessor control incrementally increases the magnitude and duration of electrical current pulses provided to the legs. Incrementally increasing the magnitude and duration of the electrical current pulses provided to the legs incrementally alters the gramload force of the suspension assembly, minutely increasing the flying height of the head. The magnitude and duration of the electrical current pulses provided to the pair of ramped planar legs is incrementally increased until the thermal asperities or defects are no longer detected.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 4 (B) is another side view of the suspension assembly shown in FIGS. 1—3 supporting a head over a storage disk in a second orientation;

FIG. 4 (C) is another side view of the suspension assembly shown in FIGS. 1–3 supporting a head over a storage disk in a third orientation.

DETAILED DESCRIPTION OF A PREFERRED EMBODIMENT

Figure 1:
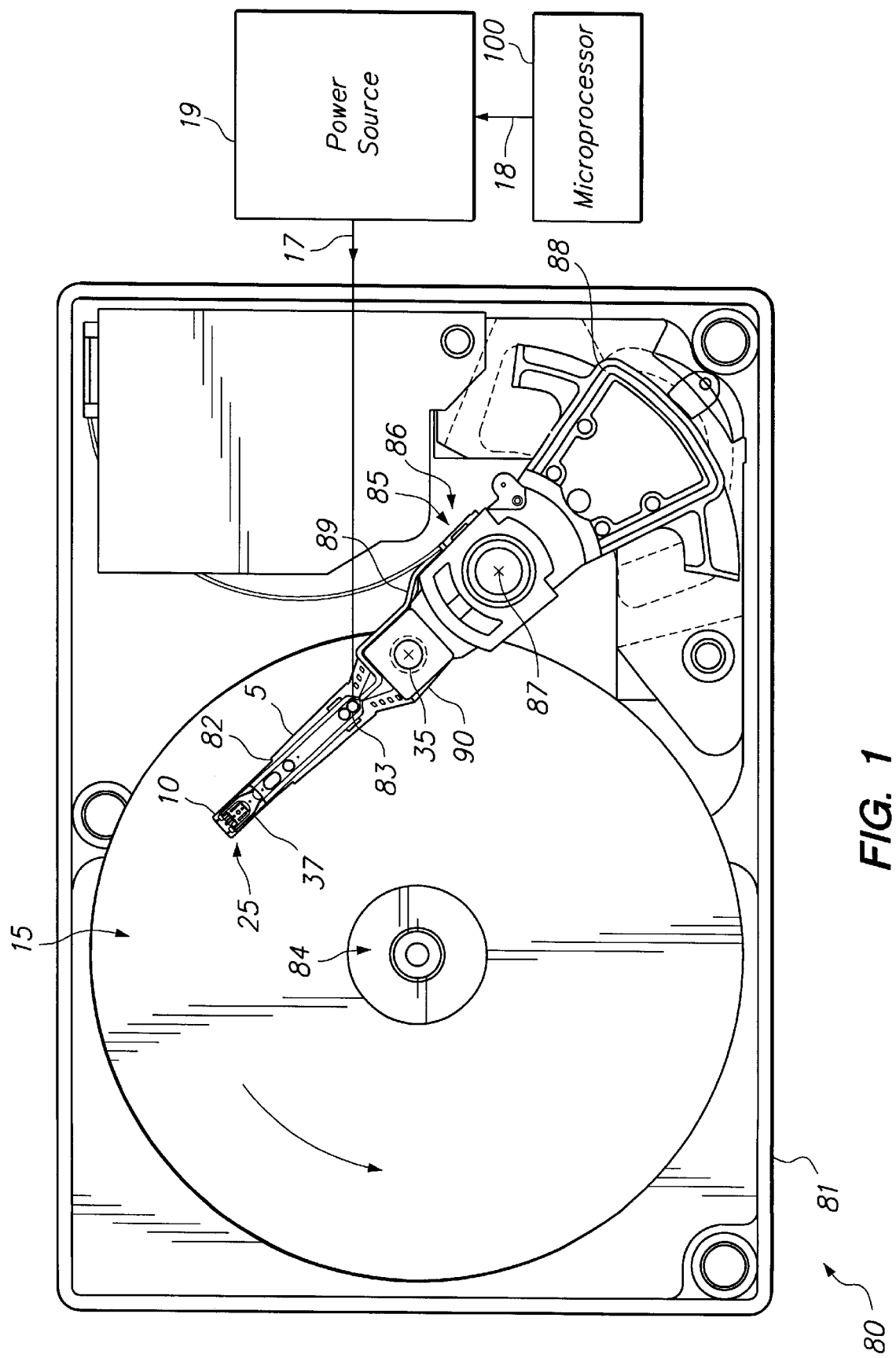
FIG. 1 is a plan view of a hard disk drive schematically showing principles of the present invention.

FIG. 1 shows a hard disk drive 80 incorporating the present invention. Disk drive 80 includes at least one suspension assembly 5 having first end 35 dimensioned for mounting on head arm 90 and second end 37 having gimbaled flexure portion 25 ("flexure portion") attached thereto. Flexure portion 25 supports head 10 over rotating storage disk 15 with an adjustable flying height. Suspension assembly 5 is coupled to power source 19 via a power conductor 17. A microprocessor 100 incorporated within disk drive 80 is coupled with power source 19 via control bus 18.

Disk drive 80 includes rigid base 81 supporting spindle 84 and a spindle motor (not shown) for rotating at least one storage disk 15 in a direction shown by the curved arrow. Disk drive 80 also includes rotary actuator assembly 86 rotationally mounted to base 81 at pivot point 87. Actuator assembly 86 includes voice coil 88 which, when selectively energized by control circuitry (not shown), moves and thereby positions an actuator E-block 89 and head arms 90, with attached suspension assembly 5 at radial track positions defined on the facing surfaces of storage disks 15. Suspension assembly 5 is secured at its first end 35 to head arm 90 by conventional ball-staking techniques. Trace/film interconnect structure 82 defined on suspension assembly 5 couples head 10 to preamplifier/write driver circuit 85.

Figure 2:
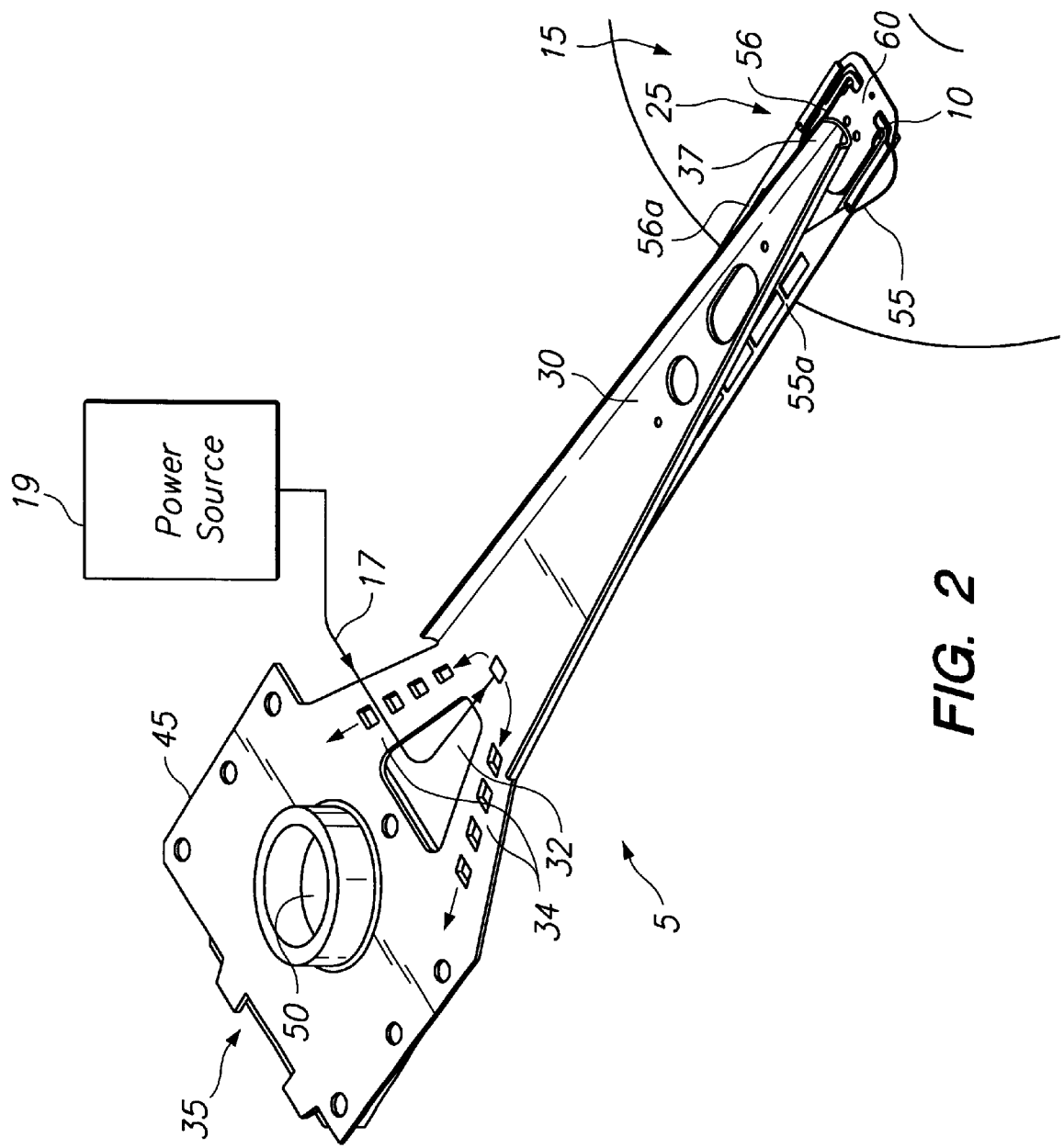
FIG. 2 is an enlarged isometric view of the suspension assembly shown in FIG. 1.

FIG. 2 is a perspective view of suspension assembly 5. Suspension assembly 5 includes an elongated flexible loadbeam 30 having a first end 35 and a second end 37. First end 35 includes an electrically grounded baseplate 45 with a central bore 50. Central bore 50 facilitates coupling suspension assembly 5 with a head arm 90. Second end 37 of loadbeam 30 includes a gimbaled flexure portion 25 that supports head 10 from its bottom surface. Suspension assembly 5 further includes a windowed portion 32. Windowed portion 32 is formed on loadbeam 30 adjacent to baseplate 45. A pair of ramped planar legs 34 is defined on the loadbeam 30 adjacent to windowed portion 32. Legs 34 are flexible and they provide a substantial portion of the downwardly directed gramload force that is transposed to loadbeam 30. The gramload force provided by legs 34 to loadbeam 30 is further transposed from loadbeam 30 to flexure portion 25 for providing a pre-load force for head 10 attached to flexure portion 25.

Flexure portion 25 comprises flexure tongue 60 and a pair of flexure legs 55 and 56 extending from flexure tongue 60. Ends 55a and 56a of flexure legs 55 and 56 are typically attached to opposite sides of loadbeam 30 by welding or other suitable techniques.

In accordance with principles of the present invention, a power trace 83 incorporated in trace/film interconnect structure 82 (FIG. 1) couples suspension assembly 5 to power source 19. Preferably, power trace 83 is electrically coupled to loadbeam 30 adjacent to windowed portion 32, enabling electrical current to uniformly traverse and heat legs 34, thereby adjusting the gramload.

In order to reduce the adjustment power requirements, load beam legs 34 may be plated with a high resistance, low anneal temperature material such as bronze. The plated material contributes a portion of the gramload force provided by legs 34 to loadbeam 30. When power source 19 provides electrical current pulses to loadbeam 30 via power conductor 17, the high resistance, low anneal temperature material is annealed and thereby alters the gramload force. Because the plated material has a lower anneal temperature than legs 34, the plated material can be annealed at a lower temperature than legs 34, altering the gramload force that the plated material contributes to legs 34. As a result, electrical current pulses with reduced power can be used to heat legs 34 to anneal the plated material.

Figure 3:
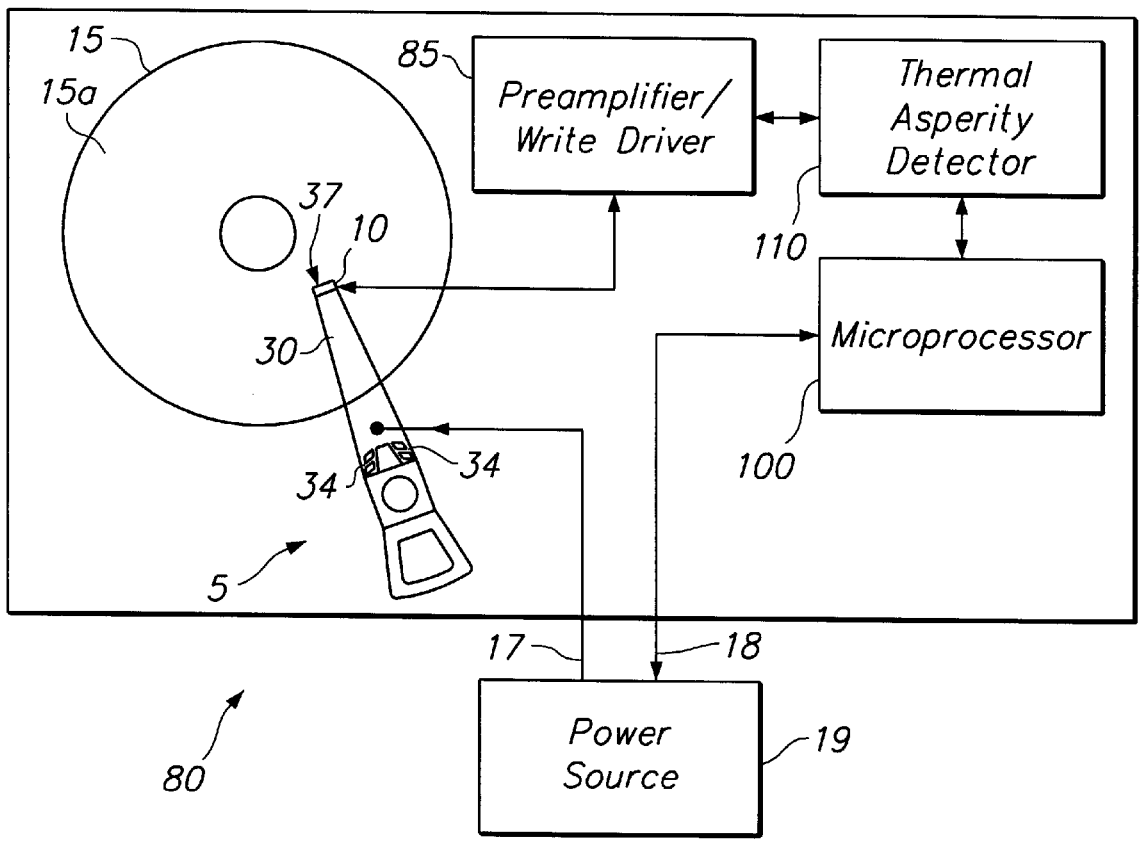
FIG. 3 is a schematic block diagram of the hard disk drive shown in FIG. 1

FIG. 3 is a schematic block diagram of hard disk drive 80, which further comprises a preamplifier/write driver circuit 85 coupled to both head 10 and thermal asperity detection circuit 110. Microprocessor 100 is coupled to both thermal asperity detection circuit 110 and power source 19. A shown, power source 19 is external to disk drive 80 and is further coupled to suspension assembly 5. However, power source 19 might be part of the disk drive.

Figure 4A:
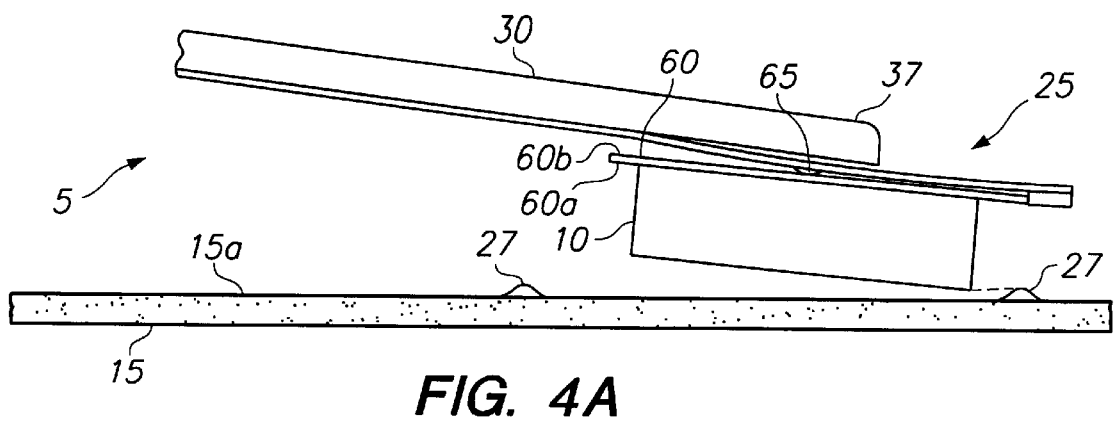
FIG. 4 (A) is a side view of the suspension assembly shown in FIGS. 1–3 supporting a head over a storage disk in a first orientation.
Figure 4B:
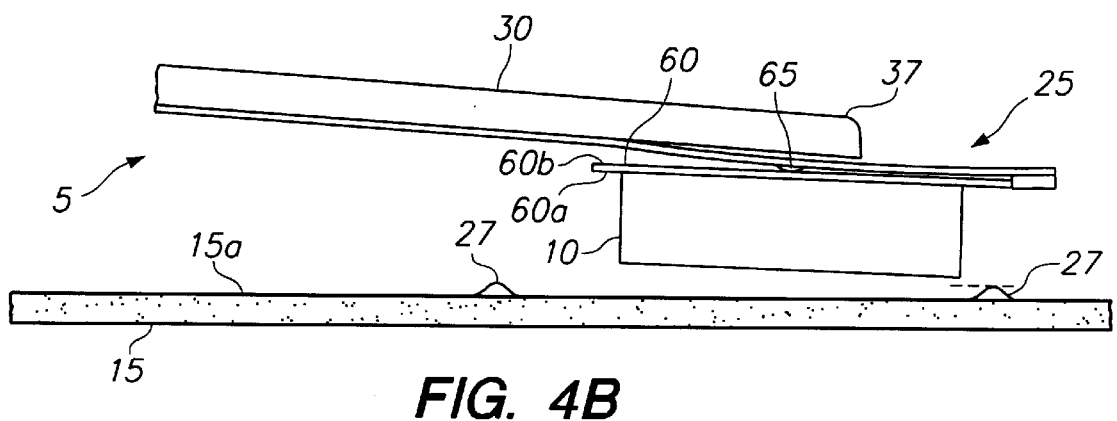
Figure 4C:
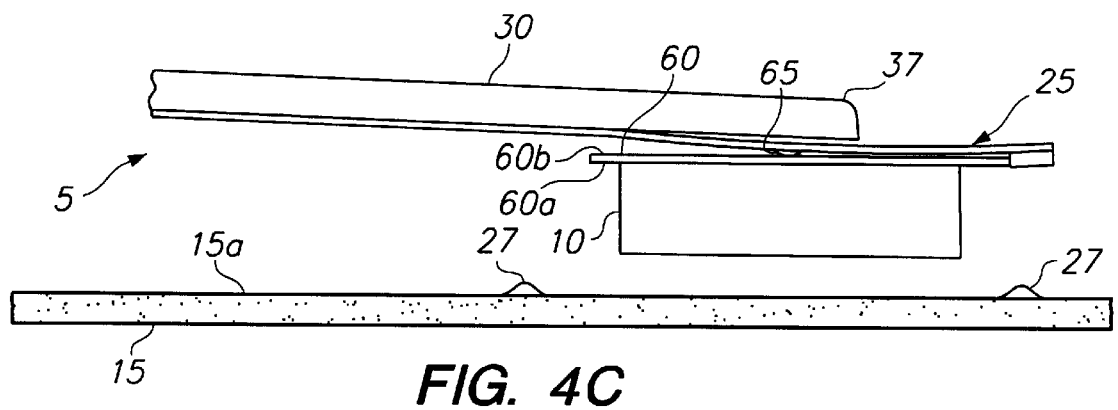

In FIGS. 4A, 4B and 4C, a load dimple 65 formed on second end 37 of loadbeam 30 contacts top surface 60b of tongue 60 so that tongue 60 can pivot about load dimple 65. Pivotal motion of tongue 60 is transposed to head 10, which is supported from bottom surface 60a of tongue 60, thereby adjusting the pitch angle (ø) of head 10 with respect to rotating disk 15.

Referring to FIG. 3 in conjunction with FIG. 4A, during operation, head 10 is supported from flexure portion 25 to fly at a predetermined flying height. After spinning up disk drive 80, but prior to the commencement of data processing operations, suspension assembly 5 is controlled to move head 10 over storage surface 15a of rotating storage disk 15 to determine if head 10 strikes asperities 27 existing on disk surface 15a. If head 10 strikes an asperity 27 there is usually a rapid transfer of energy to and an associated temperature rise near the impact area. If head 10's temperature rises abruptly as a result of striking an asperity, then its resistance also rises rapidly causing a read signal generated by magneto-resistive head 10 to exhibit a voltage base line shift with a decaying tail. The read signal is communicated to thermal asperity detection circuit 110 via preamplifier/write driver circuit 85. If the read signal is detected by thermal asperity detection circuit 110 exhibits the voltage base line shift, indicating the presence of thermal asperities, microprocessor 100 is controlled to provide a control signal to power source 19 over control bus 18 to control power source 19 to periodically provide electric current pulses to loadbeam 30 over power conductor 17. When electric current pulses are provided to loadbeam 30, heat is generated in legs 34 because of its relatively high electrical resistance. Heating legs 34 reduces the downwardly directed gramload force provided by legs 34 to loadbeam 30, flexure portion 25 and head 10. As a result of reducing the gramload force of legs 34, head 10 flies higher, as illustrated in FIG. 4B.

Referring further to FIG. 4C, the periodic electric current pulses provided by source 19 to loadbeam 30 under microprocessor 100 control can be incrementally increased in magnitude and duration until thermal asperity detection circuit 110 no longer detects the read signal with voltage base line shifts i.e. the presence of thermal asperities. Once thermal asperities are no longer detected, microprocessor 100 provides a control signal to power source 19 over control bus 18 to cease transmission of electric current pulses to loadbeam 30. In this manner, the gramload of suspension assembly 5 is incrementally adjusted to control the flying height of head 10. The flying height of head 10 is dynamically adjusted so that it simultaneously avoids asperities 27, thereby increasing the service life of the head 10. At the same time the flying height is minimized, thereby maximizing the potential storage density of the disk 15.

Once the flying height of head 10 has been adjusted and minimized, a frequency of writing data to rotating storage disk 15 may be adjusted to optimize the number of data bits-per-inch ("BPI") written thereon.

Additionally, a plurality of suspension assemblies 5, each with adjustable gramload can be incorporated into a multi-platter disk drive (not shown) to enable the adjustment of the flying height of each head 10 therein based on the number and height of thermal asperities detected. Once the flying heights of each head 10 are adjusted, according to the previously described method, the frequency of writing data to each rotating storage disk 15 may be adjusted to optimize BPI.

Figure 5:
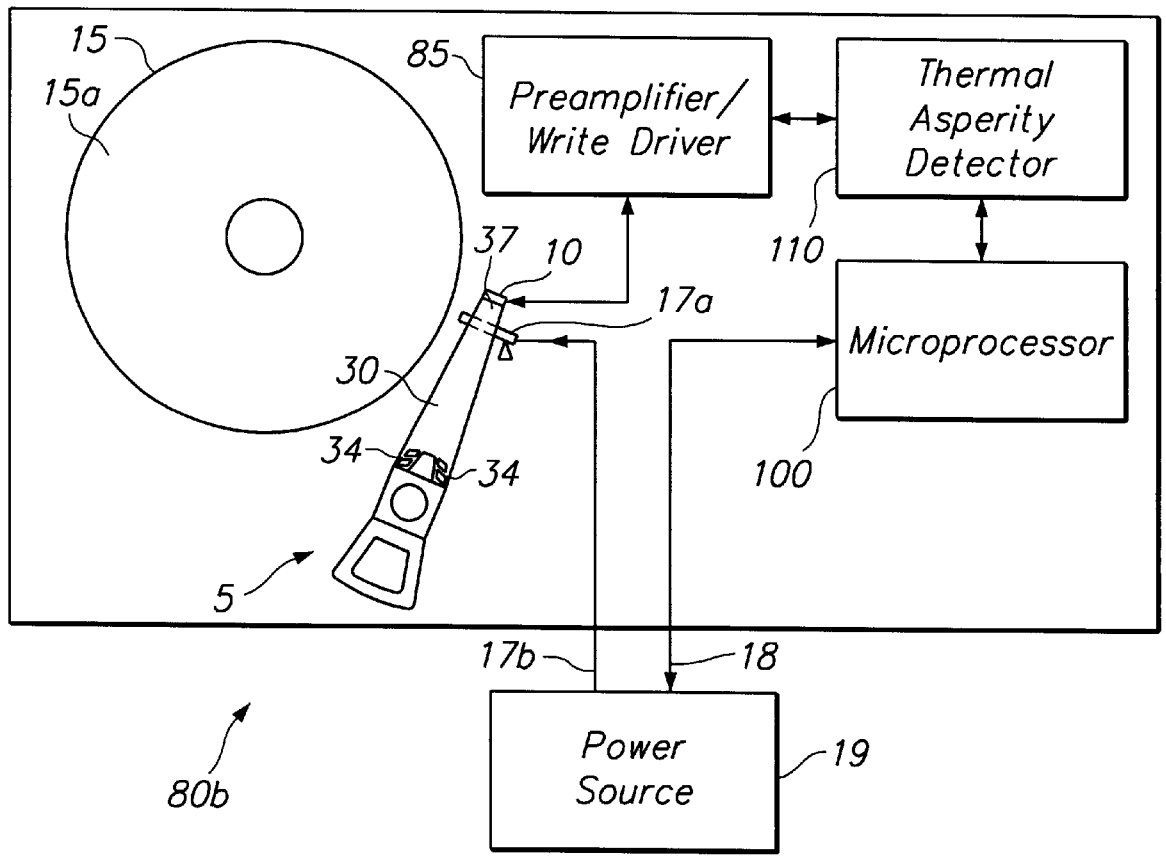
FIG. 5 is a schematic block diagram of another embodiment of the present invention.

FIG. 5 is a schematic block diagram of an alternative embodiment of the present invention. FIG. 5 comprises suspension assembly 5 with adjustable gramload, wherein the gramload is incrementally adjusted via an electrically conductive electrode 17a. Electrode 17a is coupled with power source 19 via power conductor 17b. To adjust the gramload of suspension assembly 5, suspension assembly 5 moves head 10 over disk 15 to determine, by means of head 10 and circuit 110, if thermal asperities are present. If thermal asperities are detected, suspension assembly 5 is moved to mechanically and electrically contact or rest on electrode 17a. While in mechanical and electrical contact with electrode 17a, suspension assembly 5 is subjected to periodic current pulses in the manner previously described. Thereafter, suspension assembly 5 again moves head 10 over disk 15 to determine if thermal asperities are further detected. If thermal asperities are again detected, the above process is repeated. If thermal asperities are not detected, the frequency of data written to storage disk 15 is adjusted to optimize the BPI. As a result, the storage capacity of disk drive 80b and life span of head 10 are optimized simultaneously.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. In a disk drive having one or more storage disks and a suspension assembly for suspending a head at a flying height over the storage disk, a method of adjusting the flying height conprising the steps of:

rotating the storage disk;

moving the suspension assembly and head over the rotating storage disk;

detecting the existence of thermal asperities on the storage disk; and providing electrical current to a portion of the suspension assembly without providing the electrical current to the head when thermal asperities are detected.

2. The method of adjusting the flying height of claim 1, wherein the step of providing electrical current to the suspension assembly further includes incrementally increasing the magnitude and duration of the electrical current until thermal asperities are not detected.

3. The method of adjusting the flying height of claim 2, wherein the step of incrementally increasing the magnitude and duration of the electrical current is controlled by a microprocessor.

4. The method of adjusting the flying height of claim 2 wherein the step of providing electrical current to the suspension assembly alters a gramload thereof, thereby altering the flying height.

5. The method of adjusting the flying height of claim 1 wherein the step of providing electrical current to the suspension assembly is repeated until the existence of thermal asperities is not detected.

6. In a disk drive having one or more storage disks and a suspension assembly for suspending a head at a flying height over the storage disk, a method of adjusting the flying height conprising the steps of:

(A) rotating the storage disk;

(B) moving the suspension assembly over the storage disk;

(C) detecting the existence of thermal asperities on the storage disk;

(D) moving the suspension assembly to electrically communicate with an electrode if thermal asperities are detected;

(E) applying electrical current pulses to the suspension assembly without providing the electrical current pulses to the head to alter a gramload of the suspension assembly for adjusting the flying height; and (F) repeating steps B–E until thermal asperities are not detected.

7. The method of adjusting the flying height of claim 6, further comprising the step of adjusting the frequency of data signals transmitted to the head for altering the data bits-per-inch recorded onto the storage disk.

8. In a disk drive including a storage disk, a suspension assembly and a head, wherein the suspension assembly suspends the head over the storage disk, a method of adjusting a flying height of the head over the storage disk as the storage disk rotates, the method comprising:

detecting an asperity on the storage disk using the head; and providing electrical current to the suspension assembly in response to detecting the asperity, thereby altering a gramload of the suspension assembly and altering the flying height, wherein providing the electrical current excludes providing the electrical current to the head.

9. The method of claim 8, wherein detecting the asperity includes detecting a voltage base line shift in a read signal from the head.

10. The method of claim 8, wherein providing the electrical current reduces the gramload of the suspension assembly, thereby increasing the flying height.

11. The method of claim 8, wherein providing the electrical current heats the suspension assembly, thereby altering the gramload of the suspension assembly and altering the flying height.

12. The method of claim 8, wherein providing the electrical current heats the suspension assembly, thereby reducing the gramload of the suspension assembly and increasing the flying height.

13. The method of claim 8, wherein providing the electrical current includes incrementally increasing a magnitude and duration of the electrical current until the asperity is no longer detected.

14. The method of claim 8, wherein providing the electrical current includes incrementally alter the electrical currant until the asperity is no longer detected.

15. The method of claim 8, including positioning the head over a track on the storage disk that includes the asperity while providing the electrical current.

16. The method of claim 20, wherein the electrode is positioned peripherally adjacent to the storage disk.

17. The method of claim 20, including altering a bits-per-inch recording density at which data is recorded onto the storage disk by the head in response to altering the flying height.

18. The method of claim 8, wherein providing the electrical current heats a low anneal temperature material on the suspension assembly, thereby annealing the material, reducing the gramload of the suspension assembly and increasing the flying height.

19. The method of claim 18, wherein the material is plated bronze.

20. The method of claim 8, including mechanically and electrically contacting the suspension assembly to an electrode that provides the electrical current in response to detecting the asperity.

21. The method of claim 20, wherein contacting the suspension assembly to the electrode includes positioning the head away from a track on the storage disk that includes the asperity.

22. The method of claim 21, including positioning the head over the track and repeating detecting the asperity after contacting the suspension assembly to the electrode.

23. The method of claim 8, wherein the suspension assembly includes:

a loadbeam that is elongated, substantially planar and includes first and second ends;

a baseplate coupled to the first end, wherein the baseplate is electrically grounded and includes a central bore for mechanically coupling with a pivotable actuator assembly; and a gimbaled flexure portion coupled to the second end, wherein the gimbaled flexure portion supports the head.

24. The method of claim 23, wherein the loadbeam includes:

a windowed portion; and a pair of planar legs adjacent to the windowed portion.

25. The method of claim 24, wherein the electrical current traverses the planar legs.

26. The method of claim 25, wherein the electrical current heats the planar legs, thereby adjusting the gramload of the suspension assembly.

27. The method of claim 26, wherein the planar legs include a layer of high resistance, low anneal temperature material.

28. The method of claim 27, wherein the electrical current heats and anneals the material, thereby reducing the gramload of the suspension assembly and increasing the flying height.

29. The method of claim 28, wherein the material is plated bronze.

30. The method of claim 28, wherein the planar legs provide a substantial portion of the gramload that is transposed to the head.

31. The method of claim 28, wherein the electrical current is supplied to the loadbeam by a power trace with one end attached to the loadbeam and another end attached to a power source.

32. The method of claim 31, wherein the electrical current follows a path from the power source to the power trace to an intermediate portion of the loadbeam between the planar legs and the gimbaled flexure portion to the planar legs to the baseplate.

33. In a disk drive including a storage disk, a suspension assembly and a head, wherein the suspension assembly suspends the head over the storage disk, a method of adjusting a flying height of the head over the storage disk as the storage disk rotates, the method comprising:
    detecting an asperity on the storage disk using the head; and
    providing electrical current to the suspension assembly in response to detecting the asperity, wherein providing the electrical current heats a low anncal temperature material on the suspension assembly, thereby annealing the material, reducing the gramload of the suspension assembly and increasing the flying height.

34. The method of claim 33, wherein detecting the asperity includes detecting a voltage base line shift in a read signal from the head.

35. The method of claim 33, wherein the material is plated bronze.

36. The method of claim 33, wherein providing the electrical current includes incrementally increasing a magnitude and duration of the electrical current until the asperity is no longer detected.

37. The method of claim 33, including positioning the head over a track on the storage disk tat includes the asperity while providing the electrical current.

38. The method of claim 33, including altering a bits-per-inch recording density at which data is recorded onto the storage disk by the head in response to altering the flying height.

39. The method of claim 33, wherein the suspension assembly includes:
    a loadbeam that is elongated, substantially planar arid includes first and second ends;
    a baseplate coupled to the first end, wherein the baseplate is electrically grounded and includes a central bore for mechanically coupling with a pivotable actuator assembly; and
    a gimbaled flexure portion coupled to the second end, wherein the gimbaled flexure portion supports the head.

40. The method of claim 39, wherein the loadbeam includes:
    a windowed portion; and
    a pair of planar legs adjacent to the windowed portion.

41. The method of claim 40, wherein the electrical current traverses the planar legs.

42. The method of claim 41, wherein the planar legs include a layer of the material.

43. The method of claim 42, wherein the material is plated bronze.

44. The method of claim 42, wherein the planar legs provide a substantial portion of the gramload that is transposed to the head.

45. The method of claim 42, wherein the electrical current is supplied to the loadbeam by a power trace with one end attached to the loadbeam and another end attached to a power source.

46. The method of claim 45, wherein the electrical current follows a path from the power source to the power trace to an intermediate portion of the loadbeam between the planar legs and the gimbaled flexure portion to the planar legs to the baseplate.

47. The method of claim 33, including mechanically and electrically contacting the suspension assembly to an electrode that provides the electrical current in response to detecting the asperity.

48. The method of claim 47, wherein the electrode is positioned peripherally adjacent to the storage disk.

49. The method of claim 47, wherein contacting the suspension assembly to the electrode includes positioning the head away from a track on the storage disk that includes the asperity.

50. The method of claim 49, including positioning the head over the track and repeating detecting the asperity after contacting the suspension assembly to the electrode.

51. In a disk drive including a storage disk, a suspension assembly and a head, wherein the suspension assembly suspends the head over the storage disk, and the suspension assembly includes (1) a loadbeam that is elongated, substantially planar and includes first and second ends, wherein the loadbeam includes a windowed portion and a pair of planar legs adjacent to the windowed portion, (2) a baseplate coupled to the first end, wherein the baseplate is electrically grounded and includes a central bore for mechanically coupling with a pivotable actuator assembly, and (3) a gimbaled flexure portion coupled to the second end, wherein the gimbaled flexure portion supports the head, a method of adjusting a flying height of the head over the storage disk as the storage disk rotates, the method comprising:
    detecting an asperity on the storage disk using the head; and
    providing electrical current to the suspension assembly that traverses the planar legs in response to detecting the asperity, thereby altering a gramload of the suspension assembly and altering the flying height.

52. The method of claim 51, wherein detecting the asperity includes detecting a voltage base line shift in a read signal from the head.

53. The method of claim 51, wherein providing the electrical current reduces the gramload of the suspension assembly, thereby increasing the flying height.

54. The method of claim 51, wherein providing the electrical current heats the suspension assembly, thereby altering the gramload of the suspension assembly and altering the flying height.

55. The method of claim 51, wherein providing the electrical current heats the suspension assembly, thereby reducing the gramload of the suspension assembly and increasing the flying height.

56. The method of claim 51, wherein providing the electrical current includes incrementally increasing a magnitude and duration of the electrical current until the asperity is no longer detected.

57. The method of claim 51, wherein providing the electrical current excludes altering the head.

58. The method of claim 51, including positioning the head over a track on the storage disk that includes the asperity while providing the electrical current.

59. The method of claim 51, including altering a bits-per-inch recording density at which data is recorded onto the storage disk by the head in response to altering the flying height.

60. The method of claim 51, including mechanically and electrically contacting the suspension assembly to an electrode that provides the electrical current in response to detecting the asperity.

61. The method of claim 60, wherein the electrode is positioned peripherally adjacent to the storage disk.

62. The method of claim 60, wherein contacting the suspension assembly to the electrode includes positioning the head away from a track on the storage disk that includes the asperity.

63. The method of claim 62, including positioning the head over the track and repeating detecting the asperity after contacting the suspension assembly to the electrode.

64. The method of claim 51, wherein providing the electrical current heats a high resistance, low anneal temperature material on the suspension assembly, thereby annealing the material, reducing the gramload of the suspension assembly and increasing the flying height.

65. The method of claim 64, wherein the material is a plated metal.

66. The method of claim 51, wherein the electrical current heats the planar legs, thereby adjusting the gramload of the suspension assembly.

67. The method of claim 66, wherein the planar legs include a layer of high resistance, low anneal temperature material.

68. The method of claim 67, wherein the electrical current heats and anneals the material, thereby reducing the gramload of the suspension assembly and increasing the flying height.

69. The method of claim 68, wherein the material is a plated metal.

70. The method of claim 68, wherein the planar legs provide a substantial portion of the gramload that is transposed to the head.

71. The method of claim 68, wherein the electrical current is supplied to the loadbeam by a power trace with one end attached to the loadbeam and another end attached to a power source.

72. The method of claim 71, wherein the electrical current follows a path from the power source to the power trace to an intermediate portion of the loadbeam between the planar legs and the gimbaled flexure portion to the planar legs to the baseplate.

\* \* \* \* \*